June 10, 1924.  1,497,107
L. M. LASELL
DEVICE FOR STRAIGHTENING BOWS OF MOTOR VEHICLE TOPS
Filed May 18, 1923
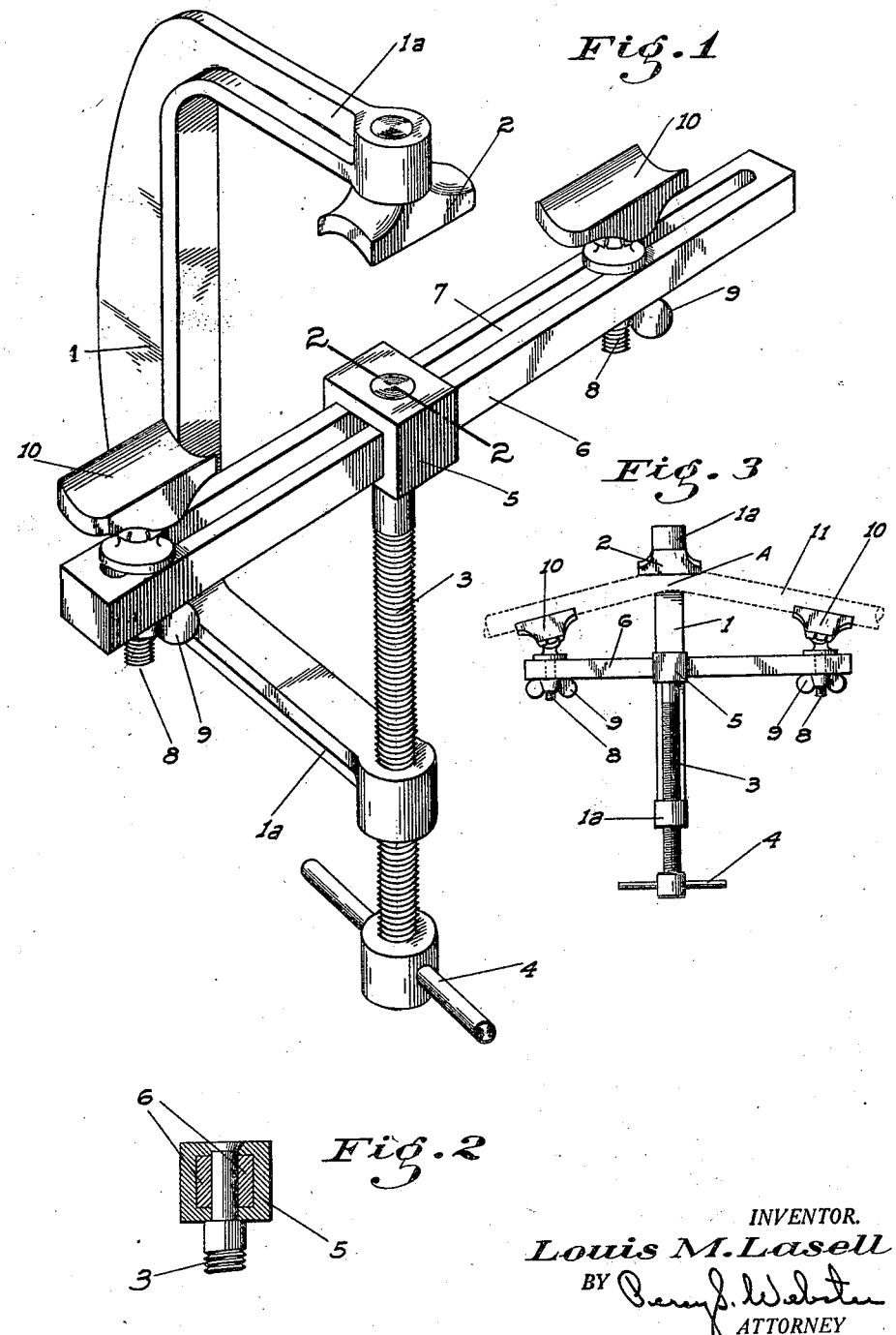
INVENTOR.
Louis M. Lasell
BY
ATTORNEY

Patented June 10, 1924.

1,497,107

UNITED STATES PATENT OFFICE.

LOUIS M. LASELL, OF SACRAMENTO, CALIFORNIA.

DEVICE FOR STRAIGHTENING BOWS OF MOTOR VEHICLE TOPS.

Application filed May 18, 1923. Serial No. 639,746.

*To all whom it may concern:*

Be it known that I, LOUIS M. LASELL, a citizen of the United States, residing at Sacramento, county of Sacramento, State of California, have invented certain new and useful Improvements in Devices for Straightening Bows of Motor Vehicle Tops; and I do declare the following to be a full, clear, and exact description of the same, reference being had to the accompanying drawings and to the characters of reference marked thereon, which form a part of this application.

This invention relates to improvements in metal bar or rod bending or straightening devices, and particularly to one especially adapted to be used for straightening the bows of motor vehicle tops when the latter have become bent after collisions, upsetting, and similar accidents to the vehicles.

The principal object of my invention is to provide a device for this purpose which may be used without removing the tops from the car, and which may be adjusted so as to be used at any point on the bow, so as to straighten any bends therein regardless of their location or extent.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the device.

Fig. 2 is a fragmentary cross section on line 2—2 of Fig. 1.

Fig. 3 is a front view, showing the device as applied in straightening a bow member.

Referring now more particularly to the characters of reference on the drawings, the numeral 1 denotes a U-shaped yoke or frame of suitable span at the outer end of one of the arms 1ª of which is swivelly mounted a pad 2 facing the opposite arm of the frame.

Threaded into said opposite arm of the frame for movement to and from the pad is a screw 3, the outer end of which has handle means 4 whereby to turn the screw. The opposite end of the screw, which is that between the arms of the frame, carries a guide sleeve 5 which is turnably mounted on the screw, a slide-frame 6 slotted as at 7 in a plane parallel to the axis of the screw, being slidably mounted in the sleeve for movement in a plane at right angles to the screw.

Slidably mounted in the slot 7 on both sides of the sleeve 5 are bolts 8 adapted to be clamped to the frame at any point along the slot by means of wingnuts 9 or similar means.

Mounted on the bolts for universal movement are pads 10, facing the plane of the pad 2 but oppositely disposed relative thereto. The pads are longitudinally curved in a concave manner so that they may engage a bow without any tendency to slip off sideways.

The manner in which the device is operated to straighten a bend is self-evident, especially if reference is made to Fig. 3, which shows the device applied to straighten out a bend A in a bow 11, an advancing movement of the screw causing the pads 10 on the movable frame 6 to approach the plane of the fixed pad 2, causing the bow engaged by the three pads to be straightened out with the approaching of the pads 10 toward the pad 2.

It will be noted that by swinging the slide 6 about the screw, its setting relative to the frame 1 may be altered as may be necessary to allow the latter to avoid any parts adjacent the member being worked on. It will also be noted that while the axes of the three pads always lie in a common straight line, the spacing of the pads 10 from each other, and from the axial plane of the screw and pad 2, may be altered at will and through a considerable range, so that the pads 10 may be close to each other and to the screw, or they may be widely separated from each other and at the same time evenly or unevenly spaced from the screw, as may be desired.

Also, independent of the pad adjustments, by sliding the frame 6 along the sleeve 5, said frame is out of the way of the bow being straightened when the latter is being worked on just beyond a permanent curve therein, or beyond a projecting part with which the said frame, if rigidly centered on the screw, would interfere.

The universal mounting of the pads enables them to accommodate themselves to engage the bow throughout their length regardless of the angular setting of the bow relative to the frame on which the pads are mounted, as shown in Fig. 2.

The nature of the tool is such that all parts can readily be made of malleable iron castings, which I believe is the best material for the purpose.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A bar straightening device comprising a rigid frame having opposed arms extending in a common plane, a pad on one arm facing the other arm, spaced pads set in opposed relation to the first named pad, a common member supporting both said spaced pads, and a screw threaded into said other arm and extending toward the first named pad, said member being supported by the screw and arranged for swivel movement about the axis thereof.

2. A bar straightening device comprising a rigid frame having opposed arms extending in a common plane, a pad on one arm facing the other arm, spaced pads set in opposed relation to the first named pad, a common member supporting both said spaced pads and itself supported from said other arm, means for moving said member to and from the plane of the first named pad, and means for altering the spacing of the spaced pads relative to and independently of each other.

3. A bar straightening device comprising a rigid frame having opposed arms extending in a common plane, a pad on one arm facing the other arm, spaced pads set in opposed relation to the first named pad, a common member supporting both said spaced pads, a screw threaded into said other arm and extending toward the first named pad, said common member being supported by the screw, and means for enabling said member to move longitudinally in a plane at right angles to the screw.

4. A bar straightening device comprising a rigid frame having opposed arms extending in a common plane, a pad on one arm facing the other arm, spaced pads set in opposed relation to the first named pad, a common member supporting both said spaced pads, a screw threaded into said other arm and extending toward the first named pad, said common member being supported by the screw, and means for enabling said member to move longitudinally in a plane at right angles to the screw, and also to rotate about the screw as an axis regardless of the longitudinal positioning of said member relative to the screw.

5. A bar straightening device comprising a rigid frame having opposed arms extending in a common plane, a pad on one arm facing the other arm, spaced pads set in opposed relation to the first named pad, a common member supporting both said spaced pads, a screw threaded into said other arm and extending toward the first named pad, said common member being supported by the screw, and means for enabling said member to move longitudinally in a plane at right angles to the screw, the pads being slidably mounted on said member for independent longitudinal movement therein.

6. A bar straightening device comprising a rigid frame having opposed arms extending in a common plane, a pad on one arm facing the other arm, a screw threaded in the other arm and extending toward the pad, a sleeve turnably mounted on the inner end of the screw, a frame slidably mounted in the sleeve for longitudinal movement in a plane at right angles to the screw, and pads mounted on the last named frame on both sides of the sleeve in opposed setting relative to the first named pad and independently and adjustably movable lengthwise of the said last named frame.

In testimony whereof I affix my signature.

LOUIS M. LASELL.